United States Patent Office 3,573,313
Patented Mar. 30, 1971

3,573,313
2- AND 4 - [(1-PIPERIDYL)-LOWER-ALKYLAMINO] QUINOLINES AND 2- AND 4-{N,N-BIS-[(1-PIPER-IDYL)-LOWER-ALKYL]AMINO}QUINOLINES
Bernard L. Zenitz, Colonie, and Alexander R. Surrey, Albany, N.Y., assignors to Sterling Drug Inc., New York, N.Y.
No Drawing. Continuation-in-part of application Ser. No. 681,087, Nov. 7, 1967, which is a continuation-in-part of application Ser. No. 433,514, Feb. 17, 1965, which in turn is a division of application Ser. No. 129,995, Aug. 8, 1961. This application Sept. 29, 1969, Ser. No. 862,001
Int. Cl. C07d 33/50
U.S. Cl. 260—288
12 Claims

ABSTRACT OF THE DISCLOSURE

New 2- and 4-[(1-piperidyl)-lower-alkylamino]quinolines and 2- and 4-{N,N-bis-[(1-piperidyl)-lower-alkyl]amino}quinolines, prepared by reacting a mono- or bis-[(1-piperidyl)-lower-alkyl]amine with a 2- or 4-haloquinoline, and having hypotensive activity.

This application is a continuation-in-part of our prior co-pending application Ser. No. 681,087, filed Nov. 7, 1967, which in turn is a continuation-in-part of our prior application Ser. No. 433,514, filed Feb. 17, 1965, which in turn is a division of our prior application Ser. No. 129,995, filed Aug. 8, 1961, and all now abandoned.

This invention relates to new 2- and 4-[(1-piperidyl)-lower-alkylamino]quinolines and 2- and 4-{N,N-bis-[(1-piperidyl)-lower-alkyl]amino}quinolines.

4-[(1-piperidyl)-lower-alkylamino]quinolines unsubstituted in the piperidine ring are known. The present invention resides in the concept of attaching to the amino nitrogen atom of a 2- or 4-aminoquinoline through an unsubstituted lower-alkylene bridge interposing from two to five carbon atoms, a 1-piperidyl group or a lower-alkylated-1-piperidyl group further substituted in the piperidine ring by substituents of a nature to be more fully described hereinafter.

The structural embodiments of the invention are represented by the formulas:

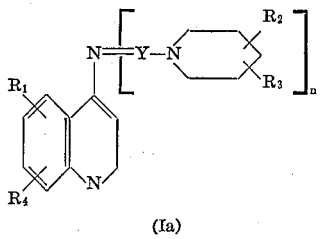

(Ia)

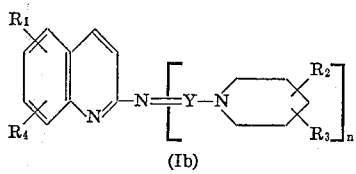

(Ib)

and are thus represented by the composite formula

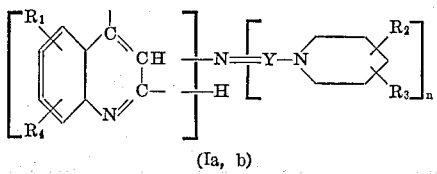

(Ia, b)

where one of the two free valences at the 2- and 4-positions of the quinoline nucleus is taken up by the group

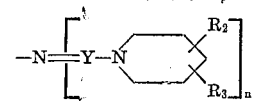

and the other of said positions when not taken up by the said group is taken up by a hydrogen atom; $n$ is one of the integers 1 and 2, and when $n$ is 1, the third valence on the amino nitrogen atom of the (1-piperidyl)-loweralkylamino group is taken up by an atom of hydrogen; $R_1$ is hydrogen or together with $R_4$ is methylenedioxy attached to adjacent carbon atoms or $R_1$ is a sterically accommodatable member of the group consisting of loweralkyl, hydroxy-lower-alkyl, chlorine, lower-alkoxy, hydroxy except 8-hydroxy, phenyl-lower-alkoxy, trifluoromethyl, lower - alkylmercapto, lower - alkylsulfinyl, and lower-alkylsulfonyl, and $R_4$ is a sterically accommodatable member of the group consisting of lower-alkyl, hydroxy-lower-alkyl-chlorine, lower-alkoxy, hydroxy except 8-hydroxy, phenyl-lower-alkoxy, or trifluoromethyl; $R_2$ is a member of the group consisting of carbamyl, N-loweralkylcarbamyl, N,N - di - lower - alkylcarbamyl, hydroxylower-alkyl, lower - alkanoyl - amino, phenyl-lower-alkyl, and cycloalkyl-lower-alkyl containing from five to seven ring carbon atoms and wherein the phenyl nucleus of the $R_1$ or $R_4$ group as pheneyl-lower-alkoxy and the $R_2$ group as phenyl-lower-alkyl is unsubstituted or is substituted by methylenedioxy attached to adjacent carbon atoms or by one or two of the same or different sterically accommodatable members of the group consisting of halogen, lower-alkyl, hydroxy, lower-alkoxy, lower-alkylmercapto, lower-alkylsulfinyl, or lower-alkylsulfonyl; $R_3$ is hydrogen or from one to four sterically accommodatable loweralkyl groups of two or more carbon atoms or from one to five methyl groups; Y is lower-alkylene containing from two to five carbon atoms and interposing at least two carbon atoms between the amino nitrogen atom of the (1-piperidyl)-lower-alkylamino group and the ring nitrogen atom of the piperidine nucleus.

In the above general Formulas Ia and Ib, the substituents represented by $R_1$ or $R_4$ when other than hydrogen, can be in any of the 5-, 6-, 7- or 8-positions of the quinoline nucleus. When $R_1$ or $R_4$ is lower-alkyl, hydroxylower-alkyl, lower alkoxy, lower-alkylmercapto, loweralkylsulfinyl, or lower-alkylsulfonyl, the lower-alkyl portion of said substituents can be either straight or branched and can contain from one to four carbon atoms. $R_1$ or $R_4$ is thus, inter alia, methyl, ethyl, hydroxymethyl, 2-hydroxyethyl, methoxy, ethoxy, isopropoxy, n-butoxy, methylmercapto, isobutylmercapto, methylsulfinyl, isobutylsulfinyl, methylsulfonyl, isobutylsulfonyl, and the like.

When $R_1$ or $R_4$ is phenyl-lower-alkoxy or when $R_2$ is phenyl-lower-alkyl, the lower-alkoxy or lower-alkyl portions of said radicals contain from one to two carbon atoms, and the phenyl portion of said radicals represents phenyl or phenyl substituted by one or two substituents, for example, halogen (including fluorine, chlorine, bromine, and iodine), lower-alkyl, hydroxy, lower-alkoxy, methylenedioxy, lower-alkylmercapto, lower-alkylsulfinyl, lower-alkylsulfonyl, and the like. When the phenyl moiety is substituted by more than one of the above substituents, the substituents can be the same or different and can occupy any of the available positions on the phenyl ring. When the substituents is a lower-alkyl, lower-alkoxy, lower-alkylmercapto, lower-alkylsulfinyl, or lower-alkylsulfonyl group, said substituents can be either straight or branched and can contain from one to about four carbon atoms. Thus $R_1$ or $R_4$ is also benzyloxy or phenethyloxy or such groups substituted in the phenyl ring by one or more of such substituents, inter alia, as fluoro, chloro, bromo, iodo, methyl, isobutyl, hydroxy, methoxy, n-butoxy, methylenedioxy, methylmercapto, isopropylmercapto, methylsulfinyl, isopropylsulfinyl, methylsulfonyl, isopropylsulfonyl, and the like.

When $R_2$ is hydroxy or lower-alkanoylamino, said radicals can occupy either the 3- or 4-positions of the piperidine ring. When $R_2$ is unsubstituted-carbamyl, N-lower-alkylcarbamyl, N,N-di-lower-alkylcarbamyl, hydroxy-lower-alkyl, phenyl-lower-alkyl, or cycloalkyl-lower-alkyl, said radicals can occupy any of the three available positions on the piperidine ring.

When $R_2$ is hydroxy-lower-alkyl, it can be straight or branched and can contain from one to about six carbon atoms. $R_2$ thus stands, inter alia, for hydroxymethyl, 1-hydroxyethyl, 2-hydroxyethyl, 3-hydroxypropyl, 4-hydroxybutyl, 5-hydroxypentyl, 6-hydroxyhexyl, and the like.

When $R_2$ is lower-alkanoylamino, the lower-alkanoyl portion of said radical can be either straight or branched and can contain from one to about six carbon atoms. $R_2$ thus also stands, inter alia, for formylamino, acetylamino, propionylamino, α-ethylbutyrylamino, and the like.

When $R_2$ is N-lower-alkylcarbamyl or N,N-di-lower-alkylcarbamyl, the alkyl moiety in each of said radicals can contain from one to about four carbon atoms and can be either straight or branched. Thus $R_2$ also stands, inter alia, for N-methylcarbamyl, N-ethylcarbamyl, N-butylcarbamyl, N,N - dimethylcarbamyl, N,N-diethylcarbamyl, N,N-dibutylcarbamyl, and the like.

When $R_2$ is cycloalkyl-lower-alkyl, the cycloalkyl moiety contains from five to seven ring carbon atoms, and the lower-alkyl moiety contains from one to two carbon atoms. Thus the cycloalkyl-lower-alkyl radical includes such radicals as cyclopentylmethyl, cyclohexylmethyl, 2-(cyclohexyl)ethyl, cycloheptylmethyl, and the like.

In the above general Formulas Ia and Ib, $R_3$ stands for hydrogen or from one to four sterically accommodatable lower-alkyl radicals or from one to five methyl groups. When $R_3$ is one or more lower-alkyl radical, each lower-alkyl radical can contain from one to about four carbon atoms, can be straight or branched and can occupy any of the five available positions on the piperidine ring, and when $R_3$ is more than one lower-alkyl radical, said radicals, can be the same or different and can occupy the same or different positions on the piperidine ring. Thus $R_3$ stands, inter alia, for methyl, ethyl, isopropyl, n-butyl, isobutyl, and the like.

In the above general Formulas Ia and Ib, Y is lower-alkylene containing from two to five carbon atoms and interposing at least two carbon atoms between the amino nitrogen atom of the (1-piperidyl)-lower-alkylamino group and the ring nitrogen atoms of the piperidine nucleus. The lower-alkylene group can be straight or branched and thus stands, inter alia, for 1,2-ethylene [—CH$_2$CH$_2$—], 1,3-propylene[—CH$_2$CH$_2$CH$_2$—]

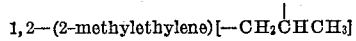

1,4-butylene[—CH$_2$CH$_2$CH$_2$CH$_2$—], 1,5-pentylene

[—CH$_2$CH$_2$CH$_2$CH$_2$CH$_2$—]

and the like.

The compounds of Formulas Ia and Ib are prepared by reacting a mono-[(1-piperidyl)-lower-alkyl]amine or a bis-[(1-piperidyl)-lower-alkyl]amine having the formula

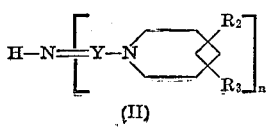

with a 2- or 4-haloquinoline having the formulas

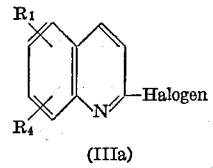

(IIIa)

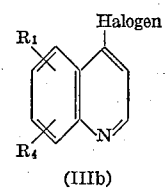

(IIIb)

and which are thus represented by the composite formula

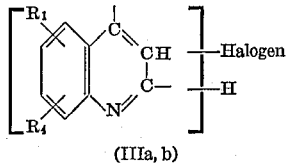

(IIIa, b)

where one of the two free valences at the 2- and 4-positions of the quinoline nucleus is taken up by the halogen atom, and the other of said positions, when not taken up by the said halogen atom, is taken up by a hydrogen atom; and where $R_1$, $R_2$, $R_3$, $R_4$, Y, and n have the meanings given above. The reaction is carried out at a temperature in the range from about 75° C. to about 150° C. and can be carried out either with or without the use of a solvent. Suitable solvents are those that are inert under the conditions of the reaction, for example, lower-alkanols, e.g. ethanol or isopropanol, and phenols. A preferred solvent is phenol.

The intermediate 2- and 4-haloquinolines of Formulas IIIa and IIIb are prepared via the corresponding 2- and 4-hydroxyquinolines by known methods. The 4-haloquinolines are prepared, for example, via the Conrad-Limpach or Jacobs-Gould syntheses which, in both cases, afford 4-hydroxyquinolines. The Conrad-Limpach synthesis involves anil condensation of a lower-alkyl formylacetate with aniline or an $R_1$-substituted-aniline at temperatures up to about 100° C. followed by thermal cyclization of the anil at temperatures around 200–250° C., for example in hot mineral oil or Dowtherm ® (a eutectic mixture of approximately 84% diphenyl ether and 16% biphenyl). The method is represented by the equations:

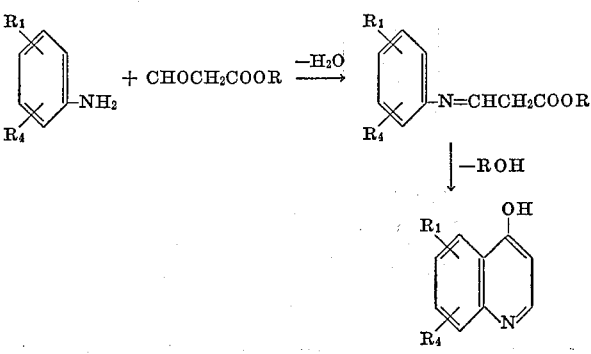

where $R_1$ and $R_4$ have the meanings given above.

The Jacobs-Gould synthesis involves reaction of aniline or an $R_1$-substituted-aniline with ethoxymethylenemalonic ester (EMME), thermal cyclization of the resulting diethyl anilinomethylenemalonate in mineral oil, followed by saponification of the resulting 3-carbethoxy-4-hydroxyquinoline and thermal decarboxylation of the product at temperatures around 200–250° C. The method is represented by the equations:

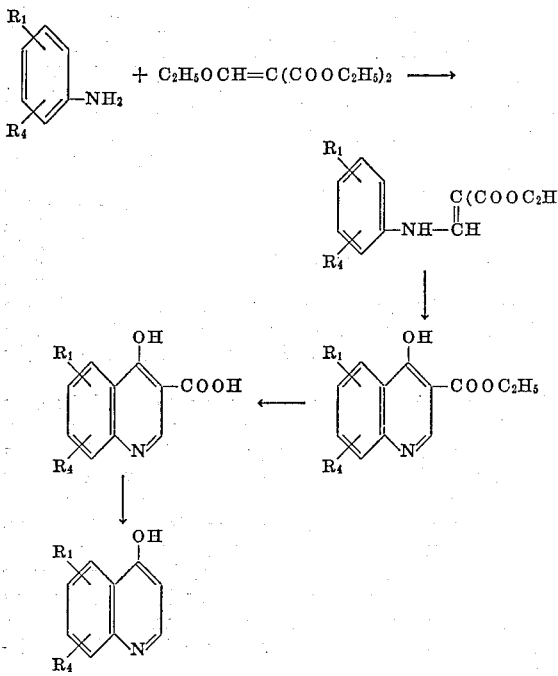

where $R_1$ and $R_4$ have the meanings given above.

The 2-haloquinolines are prepared, for example, by the Knorr synthesis, or by reduction and subsequent cyclization of o-nitrocinnamic acids. The Knorr synthesis involves condensation of aniline or an $R_1/R_4$-substituted aniline with a lower-alkyl formylacetate at temperatures above 100° C. (as distinguished from the Conrad-Limpach synthesis which is carried out at temperatures below 100° C.) and cyclization of the resulting arylamide with hot concentrated sulfuric acid. The reaction is represented by the equations:

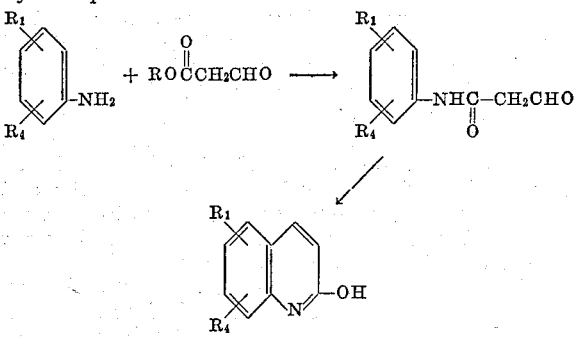

where $R_1$ and $R_4$ have the meanings given above.

Preparation of 2-hydroxyquinolines from o-nitrocinnamic acid or its $R_1/R_4$-substituted derivatives involves catalytic reduction of the nitro group to an amino group, and cyclization of the resulting o-aminocinnamic acid according to the equations:

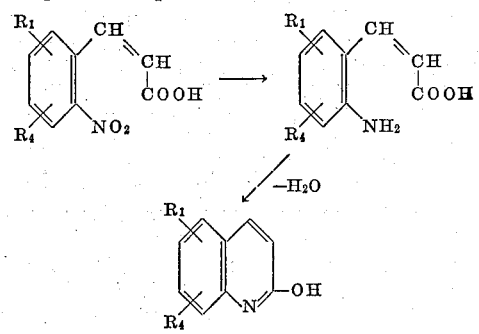

where $R_1$ and $R_4$ have the meanings given above.

The o-nitrocinnamic acids are in turn prepared by dibromination of an o-nitrotoluene, hydrolysis of the resulting α,α-dibromotoluene derivative with dilute sulfuric acid, aldol condensation of the resulting o-nitrobenzaldehyde with ethyl acetate, and saponification of the resulting cinnamate ester, as represented by the equations:

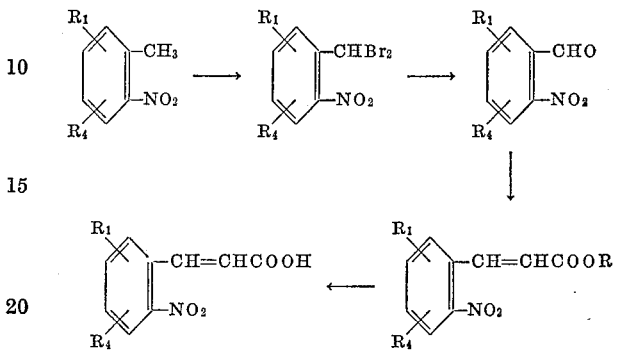

where $R_1$ and $R_4$ have the meanings given above, and R represents lower-alkyl.

The 2- and 4-hydroxyquinolines obtained in the above-described synthetic procedures are then converted to the corresponding 2- and 4-haloquinolines of Formulas IIIa and IIIb, respectively, by reaction of the former by known procedures with a phosphorus oxyhalide.

It will be appreciated from the foregoing description of methods for preparing the 2- and 4-haloquinolines that the substituents represented by the groups $R_1$ and $R_4$, and embracing methylenedioxy attached to adjacent carbon atoms or one or two of the same or different sterically accommodatable members of the group consisting of lower-alkyl, hydroxy-lower-alkyl, halogen, lower alkoxy, hydroxy, phenyl-lower-alkoxy, trifluoromethyl, lower-alkyl-mercapto, lower alkylsulfinyl, or lower-alkylsulfonyl, are remote from the site of reaction and thus do not take place in or interfere with the reactions. The $R_1/R_4$-substituted anilines and $R_1/R_4$-substituted o-nitrotoluenes are widely known classes of compounds and are thus readily available as starting materials.

The intermediate mono- and bis-[(1-piperidyl)-lower-alkyl]amines of Formula II are disclosed and claimed in our copending application Ser. No. 596,832 (now U.S. Pat. 3,381,012), filed November 25, 1966 as a continuation-in-part of our prior application Ser. No. 432,845 (now U.S. Pat. 3,325,500) which in turn is a continuation-in-part of our prior application Ser. No. 129,995, filed Aug. 8, 1961, and now abandoned. As disclosed in said application Ser. No. 596,832, the primary and secondary amines of Formula II are prepared by reducing with hydrogen in the presence of a catalyst a 1-(cyano-lower-alkyl)-piperidine having the formula

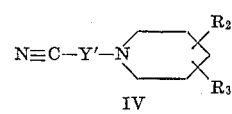

IV where $R_2$ and $R_3$ have the meanings given above; and Y' is lower-alkylene containing from one to four carbon atoms, which can be either straight or branched, and interposing at least one carbon atom between the ring nitrogen atom of the piperidine nucleus and the cyano group. The reduction of the compounds of Formula IV is carried out in an organic solvent inert under the conditions of the reaction, for example, methanol, ethanol, or isopropanol, at a temperature in the range from about 20° C. to about 70° C. and at hydrogen pressures in the range from about 40 pounds p.s.i. to about 1,000 pounds p.s.i. When the reduction is carried out in a neutral medium, the bis-[1-piperidyl)-lower-alkyl]amines of Formula II (n is 2) are the predominant products, although the mono-[1-piperidyl)-lower-alkyl]amines (n is 1) are also produced in minor amounts. On the other hand, if the solvent used is first saturated with anhydrous ammonia, so that the reaction medium is strongly ammoniacal, the predominant products are the mono-[(1-piperidyl)-lower-alkyl]amines, although the bis-[(1-piperidyl)-lower-alkyl]amines are also produced in minor amounts. Suitable catalysts are platinum oxide, palladium-on-charcoal, and rhodium-on-alumina. A preferred catalyst is rhodium-on-alumina.

The 1-(cyano-lower-alkyl)piperidines of Formula IV are disclosed and claimed in our prior application Ser. No. 473,228, filed July 19, 1965 (now U. S. Pat. 3,262,936) which is a continuation-in-part of our prior application Ser. No. 129,995, filed Aug. 8, 1961, and now abandoned. As disclosed in said U.S. Pat. 3,262,936, the compounds of Formula IV where Y′ is lower-alkylene interposing two carbon atoms between the cyano group and the ring nitrogen atom of the piperidine nucleus are prepared by reacting an acrylonitrile with a piperidine in the presence of a basic catalyst. The reaction is represented by the equation:

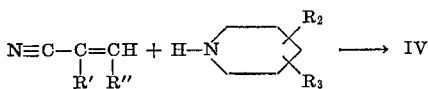

where $R_2$ and $R_3$ have the meanings given above and each of R′ and R″ stands for hydrogen or the methyl radical, or one of R′ and R″ is hydrogen while the other is the ethyl radical. It will be seen that this method is suitable for preparing compounds having either a straight (R′ and R″ are hydrogen) or branched (R′ and/or R″ are methyl) alkylene group, Y. The reaction is preferably carried out in an organic solvent inert under the conditions of the reaction, for example, water, benzene, dioxane, pyridine, or acetonitrile. A preferred solvent is water. Suitable basic catalysts are tri-lower-alkylamines, for example, triethylamine, or basic tertiary heterocyclic amines, for example, pyridine, or quaternary ammonium hydroxides, for example, Triton® B (benzyl trimethylammonium hydroxide). A preferred basic catalyst is triethylamine.

The compounds of Formula IV where Y′ is lower-alkylene interposing from one to four carbon atoms between the cyano group and the ring nitrogen atom of the piperidine nucleus are prepared by reacting either a straight or branched chain cyano-lower-alkyl halide, e.g., α-chloroacetonitrile, β-chloropropionitrile, α-chloropropionitrile, or β-chlorobutyronitrile, with an appropriately substituted piperidine in the presence of an acid-acceptor. The reaction is preferably carried out in an organic solvent inert under the conditions of the reaction, for example, tetrahydrofuran, acetone, methanol, ethanol, isopropanol, and the like. The purpose of the acid-acceptor is to take up the hydrogen halide split out during the course of the reaction and is a basic substance which forms water-soluble by-products easily separable from the main product of the reaction and includes such substances as alkali metal salts of weak acids, e.g., sodium carbonate, sodium bicarbonate, potassium carbonate, sodium acetate, and the like. The acid-acceptor can also be in the form of an excess quantity of the substituted-piperidine.

The novel compounds of the instant invention are the compounds of Formulas Ia and Ib and their acid-addition salts. The compounds of Formulas Ia and Ib in free base form, are converted to the acid-addition salt form by interaction of the base with an acid. In like manner, the free bases can be regenerated from the acid-addition salt form in the conventional manner, that is, by treating the salts with strong aqueous bases, for example alkali metal hydroxides, alkali metal carbonates, and alkali metal bicarbonates. The bases thus regenerated can then be interacted with the same or a different acid to give back the same or a different acid-addition salt. Thus the novel bases and all of their acid-addition salts are readily interconvertible.

It will thus be appreciated that each of Formulas Ia and Ib not only represents the structural configuration of the bases of the invention but each is also representative of the respective structural entity which is common to all of our respective compounds of Formulas Ia and Id, whether in the form of the free bases or in the form of the acid-addition salts of the bases. We have found that by virtue of this common structural entity, the bases and their acid-addition salts have inherent pharmacodynamic activity of a type to be more fully described hereinbelow. This inherent pharmacodynamic activity can be enjoyed in useful form for pharmaceutical purposes by employing the free bases themselves or the acid-addition salts formed from pharmaceutically-acceptable acids, that is acids whose anions are innocuous to the animal organism in effective doses of the salts so that beneficial properties inherent in the common structural entity represented by the free bases are not vitiated by side-effects ascribable to the anions.

In utilizing this pharmacodynamic activity of the salts of the invention, we prefer of course to use pharmaceutically-acceptable salts. Although water-insolubility, high toxicity, or lack of crystalline character may make some particular salt species unsuitable or less desirable for use as such in a given pharmaceutical application, the water-insoluble or toxic salts can be converted to the corresponding pharmaceutically-acceptable bases by decomposition of the salt with aqueous base as explained above, or alternatively, they can be converted to any desired pharmaceutically-acceptable acid-addition salt by double decomposition reactions involving the anion, for example, by ion-exchange procedures.

Moreover, apart from their usefulness in pharmaceutical applications, our salts are useful as characterizing or identifying derivatives of the free bases or in isolation or purification procedures. Like all of the acid-addition salts, such characterizing or purification salt derivatives can, if desired, be used to regenerate the pharmaceutically-acceptable free bases by reaction of the salts with aqueous base, or alternatively can be converted to a pharmaceutically-acceptable acid-addition salt by, for example, ion-exchange procedures.

It will be appreciated from the foregoing that all of the acid-addition salts of our new bases are useful and valuable compounds, regardless of considerations of solubility, toxicity, physical form, and the like.

The novel feature of the compounds of the invention, then, resides in the concept of the bases and cationic forms of the new 2- and 4-{mono- and bis-[(1-piperidyl)-lower-alkyl]-amino}quinolines and not in any particular acid moiety or acid anion associated with the salt forms of the compounds; rather, the acid moieties or anions which can be associated in the salt forms are in themselves neither novel nor critical and therefore can be any acid anion or acid-like substance capable of salt formation with bases. In fact, in aqueous solutions, the base form or water-soluble acid-addition salt form of the compounds of the invention both possess a common protonated cation or ammonium ion.

Thus the acid-addition salts discussed above are prepared from any organic acid, inorganic acid (including organic acids having an inorganic group therein), or organometallic acid as exemplified by organic mono- and polycarboxylic acids; such as found, for example, in Beilstein's Organische Chemie, 4th ed., vols. III, IV, IX, X, XIV, XVII, XIX, XXI, XXII, and XXV; organic mono- and polysulfonic and -sulfinic acids; such as found, for example, in Beilstein vol. VI, XI, XVI, and XXII; organic phosphonic and phosphinic acids; such as found, for example, in Beilstein vols. XI and XVI; organic acids of arsenic and antimony; such as found, for example, in Beilstein vol. XVI; organic heterocyclic carboxylic, sulfonic, and sulfinic acids such as found, for example, in Beilstein vols. XVIII, XXII, and XXV; acidic ion-exchange resins; and inorganic acids of any acid-forming element or combination of elements, such as found in Mellor, Comprehensive Treatise on Inorganic and Theoretical Chemistry, Longman's Green and Co., New York, N.Y. vols. I–XVI. In addition, other salt-forming compounds which are acidic in their chemical properties, but which are not generally considered as acids in the same esnse as carboxylic or sulfonic acids, are also considered to be among the numerous acids which can be used to prepare acid-addition salts of the compounds of the invention. Thus there is also comprehended acidic phenolic compounds, such as found, for example, in vol. VI of Beilstein, acidic compounds having "activated" or acidic hydrogen atoms, as for example, picrolonic acid, or barbituric acid derivatives having an acidic proton, such as found, for example, in Cox et al. Medicinal Chemistry, vol. IV, John Wiley and Sons, Inc., New York, N.Y. (1959). Also comprehended as salt forming agents are so-called Lewis acids which lack a pair of electrons in the outer "electron shell" and react with basic compounds having an unshared pair of electrons to form salts, for example boron trifluoride.

Thus appropriate acid-addition salts are those derived from such diverse acids as formic acid, acetic acid, isobutyric acid, alpha-mercaptopropionic acid, malic acid, fumaric acid, succinic acid, succinamic acid, tartaric acid, citric acid, lactic acid, benzoic acid, 4-methoxybenzoic acid, phthalic acid, anthranilic acid, 1-naphthalenecarboxylic acid, cinnamic acid, cyclohexanearboxylic acid, mandelic acid, tropic acid, crotonic acid, acetylene dicarboxylic acid, sorbic acid, 2-furancarboxylic acid, cholic acid, pyrenecarboxylic acid, 2-pyridinecarboxylic acid, 3-indoleacetic acid, quinic acid, sulfamic acid, methanesulfonic acid, isethionic acid, benezenesulfonic acid, p-toluenesulfonic acid, benzenesulfonic acid, butylarsonic acid, diethylphosphinic acid, p-aminophenylarsinic acid, phenylstibnic acid, phenylphosphinous acid, methylphosphinic acid, phenylphosphinic acid, acidic ion-exchange resin salts, hydrofluoric acid, hydrochloric acid, hydrobromic acid, hydriodic acid, perchloric acid, nitric aid, sulfuric acid, phosphoric acid, hydrocyanic acid, phosphotungstic acid, molybdic acid, phosphomolybdic acid, pyrophosphoric acid, arsenic acid, picric acid, picrolonic acid, barbituri acid, boron trifluoride, and the like.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

Pharmacological evaluation of the compounds of Formulas Ia and Ib have shown that they possess pharmacodynamic properties, in particular, hypotensive activity in mammalian species in the dose range from 5 to 50 mg./kg. thus indicating their usefulness as blood pressure lowering agents.

The structures of the compounds of the invention are established by their mode of synthesis and corroborated by the correspondence between calculated values for the elements and values found by chemical analysis.

The following examples will further illustrate the invention.

EXAMPLE 1

4 - {3 - [4 - (N - methylcarbamyl) - 1 - piperidyl]propylamino}-7-chloroquinoline [Ia; $R_1$ is 7-Cl, $R_2$ is 4-CONHCH$_3$, $R_3$ is H, Y is (CH$_2$)$_n$, $n$ is 1].

A mixture of 11.9 g. (0.06 mole) of 4,7-dichloroquinoline, 17.9 g. (0.09 mole) of 3-[4-(N-methylcarbamyl)-1-piperidyl]propylamine, and 35 g. of phenol was heated with stirring at 115–125° C. for twenty-four hours. The mixture while still warm was dissolved in 300 ml. of chloroform and the solution extracted with three 100 ml. portions of 10% hydrochloric acid. The combined acid extracts were basified with concentrated ammonium hydroxide, extracted with chloroform, and the chloroform extracts dried over Drierite® and taken to dryness. The residue was dissolved in 10% acetic acid, filtered and the filtrate basified with concentrated ammonium hydroxide. The brown gum which separated was washed by decantation with water, triturated with ethyl acetate, and the resulting solid was collected and recrystallized from an ethanol-ethyl acetate mixture giving 9.4 g. of 4-{3-[4-(N-methylcarbamyl) - 1 - piperidyl]propylamino} - 7 - chloroquinoline, M.P. 174.8–175.4° C. (corr.).

4 - {3 - [4 - (N - methylcarbamyl)-1-piperidyl]propylamino}-7-chloroquinoline reacts with formic acid, acetic acid, isobutyric acid, alpha-mercaptopropionic acid, malic acid, fumaric acid, succinic acid, succinamic acid, tartaric acid, citric acid, lactic acid, benzoic acid, 4-methoxybenzoic acid, phthalic acid, anthranilic acid, 1-naphthalenecarboxylic acid, cinnamic acid, cyclohexanecarboxylic acid, mandelic acid, tropic acid, crotonic acid, acetylene dicarboxylic acid, sorbic acid, 2-furanecarboxylic acid, chloic acid, pyrenecarboxylic acid, 2-pyridinecarboxylic acid, 3-indoleacetic acid, quinic acid, sulfamic acid, methanesulfonic acid, isethionic acid, benzenesulfonic acid, p-toluenesulfonic acid, benzenesulfinic acid, butylarsonic acid, diethylphosphinic acid, p-aminophenylarsinic acid, phenylstibnic acid, phenylphosphinous acid, methyl-phosphonic acid, phenylphosphinic acid, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, phosphomolybdic acid, pyrophosphoric acid, arsenic acid, picric acid, picrolonic acid, barbituric acid, boron trifluoride, and the like, to give respectively, the formate, acetate isobutyrate, alphamercaptopropionate, malate (or acid malate), fumarate (or acid fumarate) succinate (or acid succinate), succinamate, tartrate (or bitartrate), citrate (or acid citrate), lactate, benzoate, 4-methoxybenzoate, phthalate (or acid phthalate), anthranilate, 1-naphthalenecarboxylate, cinnamate, cyclohexanecarboxylate, mandelate, tropate, crotonate, acetylene dicarboxylate, sorbate (or acid sorbate), 2-furancarboxylate, chlorate, pyrenecarboxylate, 2-pyridinecarboxylate, 3-indoleacetate, quinate, sulfamate, methanesulfonate, isethionate, benzenesulfonate, p-toluenesulfonate, benzenesulfinate, butylarsonate, diethylphosphinate, p-aminophenylarsinate, phenylstibnate, phenylphosphinite, methylphosphonate, phenylphosphinate, hydrofluoride, hydrochloride, hydrobromide, hydriodide, percholorate, nitrate, sulfate (or bisulfate), phosphate (or acid phosphate), hydrocyanide, phosphotungstate, molybdate, phosphomolybdate, pyrophosphate, arsenate, picrate, picrolonate, barbiturate, and boron trifluoride salts.

4 - {3 - [4 - (N - methylcarbamyl) - 1 - piperidyl]propylamino}-7-chloroquinoline can be reacted with hydriodic acid to form 4 - {3 - [4 - (N - methylcarbamyl)-1-piperidyl]propylamino} - 7 - chloroquinoline hydriodide, useful as a characterizing intermediate.

4 - {3 - [4 - (N - methylcarbamyl) - 1 - piperidyl]propylamino}-7-chloroquinoline, in the form of its hydriodide salt, can be converted to the hydrochloride salt by passing an aqueous solution of the former over an ion-exchange resin saturated with chloride ions such as a resin of the polytrimethyl(styrenedivinylbenzene)ammonium chloride type, for example, Rohm and Haas' Amberlite® IRA–400 resin.

EXAMPLES 2–7

The following examples of Formula Ia listed below in Table 1 were prepared according to the manipulative procedure described above in Example 1 using 4,7-dichloroquinoline and an appropriate mono- or bis-[(1-piperidyl)-lower-alkyl]amine. In each case $R_1$ is 7-Cl, $R_3$ is H, and Y is (CH$_2$)$_3$. All melting points are corrected.

TABLE 1

| Example | $R_2$ | n | m.p., °C. | Crystallized from— |
|---|---|---|---|---|
| 2 | 4-CONH$_2$ | 1 | 217.4–219.6 | Ethanol/ethyl acetate. |
| 3 | 4-CONHC$_2$H$_5$ | 1 | 188.2–188.8 | Do. |
| 4 | 4-CON(CH$_3$)$_2$ | 1 | 187.2–184.4 | Acetone. |
| 5 | 4-CON(C$_2$H$_5$)$_2$ | 1 | 140.0–140.6 | Ethyl acetate/hexane. |
| 6 | 4-CONHCH$_3$ | 2 | 164.0–165.0 | Ethanol/ethyl acetate. |
| 7 | 4-CONHC$_2$H$_5$ | 2 | 165.4–166.2 | Do. |

EXAMPLES 8-34

By following the manipulative procedure described above in Example 1, substituting for the 4,7-dichloroquinoline and the 3-[4-(N-methylcarbamyl)-1-piperidyl]-propylamine used therein, molar equivalent amounts of an appropriate 4-halo-substituted-quinoline and an appropriate mono- or bis-[(substituted-1-piperidyl)-loweralkyl]amine, there can be obtained the 4-{mono- or bis-[(substituted - 1 - piperidyl)-lower-alkyl]amino}-substituted-quinolines of Formula Ia listed below in Table 2:

EXAMPLES 36-49

By following the manipulative procedure described above in Example 1, substituting for the 4,7-dichloroquinoline and the 3-[4-(N-methylcarbamyl)-1-piperidyl] propylamine used therein, molar equivalent amounts of an appropriate 2-halo-substituted-quinoline and an appropriate (substituted-1-piperidyl)-lower-alkylamine, there can be obtained the 2-[(substituted-1-piperidyl)-loweralkylamino]-substituted-quinolines of Formula Ib ($n$ is 1) listed below in Table 3:

TABLE 2

| Example | Y/$R_1$ | $R_2/R_3$ | n |
|---|---|---|---|
| 8 | $(CH_2)_3$ / 6,7-$(CH_3O)_2$ | 4-$CH_2OH$ | 1 |
| 9 | $(CH_2)_3$ / 7-$CH_3S$ | 4-$CH_2CH_2CH_2OH$ | 1 |
| 10 | $(CH_2)_2$ / 7-$CH_3SO$ | 4-HO, 2,6-di-$CH_3$ | 1 |
| 11 | $(CH_2)_5$ / 7-$CH_3SO_2$ | 4-HO, 2,2,4,6,6-penta-$CH_3$ | 1 |
| 12 | $(CH_2)_3$ / 7-$C_6H_5CH_2O$ | 4-HO, 2,2-di-$CH_3$-6-$(CH_3)_2CHCH_2$ | 1 |
| 13 | $(CH_2)_3$ / 7-(4-$ClC_6H_4CH_2O$) | 4-$(CH_2)_6OH$ | 1 |
| 14 | $(CH_2)_3$ / 7-4-$HOC_6H_4CH_2O$) | 4-NHCHO | 1 |
| 15 | $(CH_2)_3$ / 7-(3,4-$OCH_2OC_6H_3CH_2O$) | 4-NHCOCH$(C_2H_5)CH_2CH_3$ | 1 |
| 16 | $(CH_2)_3$ / 7-(3-$CH_3C_6H_4CH_2O$) | 3-CONHCH$_2CH_2CH_2CH_3$ | 1 |
| 17 | $(CH_2)_3$ / 7-(3-$CH_3SO_2C_6H_4CH_2O$) | 4-$CONH_2$ | 1 |
| 18 | $(CH_2)_3$ | 4-$CONH_2$ | 1 |
| 19 | $(CH_2)_3$ / 5-$CH_3O$ | 4-$CON(CH_3)_2$ | 2 |
| 20 | $(CH_2)_3$ / 7-$CH_3S$ | 4-$CH_2OH$ | 2 |
| 21 | $(CH_2)_3$ / 7-$CH_3SO$ | 4-$CH_2CH_2CH_2OH$ | 2 |
| 22 | $(CH_2)_2$ / 7-$CH_3SO_2$ | 4-HO, 2,6-di-$CH_3$ | 2 |
| 23 | $(CH_2)_5$ / 7-$C_6H_5CH_2CH_2O$ | 4-HO, 2,2,4,6,6-penta-$CH_3$ | 2 |
| 24 | $(CH_2)_3$ / 7-4($ClC_6H_4CH_2CH_2O$) | 4-HO, 2,2—di-$CH_3$-6-$(CH_3)_2CHCH_2$ | 2 |
| 25 | $(CH_2)_3$ / 7-(4-$HOC_6H_4CH_2CH_2O$) | 4-$(CH_2)_6OH$ | 2 |
| 26 | $(CH_2)_3$ / 7-(3,4-$OCH_2OC_6H_3CH_2CH_2O$) | 4-NHCHO | 2 |
| 27 | $(CH_2)_3$ / 7-(3-$CH_3C_6H_4CH_2CH_2O$) | 4-NHCOCH$(C_2H_5)CH_2CH_3$ | 2 |
| 28 | $(CH_2)_3$ / 7-(2-$CH_3OC_6H_4CH_2CH_2O$) | 3-CONHCH$_2CH_2CH_2CH_3$ | 2 |
| 29 | $(CH_2)_3$ | 4-$CONH_2$ | 2 |
| 30 | $(CH_3)_2$ | 4-$CH_2C_6H_5$ | 2 |
| 31 | $(CH_2)_3$ | 4-$CH_2C_6H_{11}$ | 2 |
| 32 | $(CH_2)_3$ / 6-$CH_3$ | 4-$CH_2C_6H_{11}$ | 2 |
| 33 | $(CH_2)_3$ / 6-$HOCH_2$ | 4-$CH_2C_6H_{11}$ | 2 |
| 34 | $(CH_2)_3$ / 6,7-$OCH_2O$ | 4-$CH_2C_6H_{11}$ | 2 |

EXAMPLE 35

2-[3-(4-carbamyl - 1 - piperidyl)propylamino]quinoline [Ib; $R_1$ is H, $R_2$ is 4-$CONH_2$, $R_3$ is H, $n$ is 1].

By reacting 2-chloroquinoline with 3-(4-carbamyl-1-piperidyl)propylamine according to the manipulative procedure described above in Example 1, there can be obtained 2-[3-(4-carbamyl-1-piperidyl)propylamino]quinoline.

TABLE 3

| Ex. | Y/$R_1$ | $R_2/R_3$ |
|---|---|---|
| 36 | $(CH_2)_3$ / 7-Cl | 4-$CONHCH_3$ |
| 37 | $(CH_2)_3$ / 7-Cl | 4-$CONHC_2H_5$ |
| 38 | $(CH_2)_3$ / 7-Cl | 4-$CON(CH_3)_2$ |
| 39 | $(CH_2)_3$ / 7-Cl | 4-$CON(C_2H_5)_2$ |

TABLE 3.—Continued

| Ex. | Y/R₁ | R₂/R₃ |
|---|---|---|
| 40 | (CH₂)₃ / 5-CH₃O | 4-CH₂OH |
| 41 | (CH₂)₃ / 7-CH₃S | 4-CH₂CH₂CH₂OH |
| 42 | (CH₂)₂ / 7-CH₃SO | 4-HO / 2,6-di-CH₃ |
| 43 | (CH₂)₅ / 7-CH₃SO₂ | 4-HO / 2,2,4,6,6-penta-CH₃ |
| 44 | (CH₂)₃ / 7-C₆H₅CH₂O | 4-HO / 2,2-di-CH₃-6-(CH₃)₂CHCH₂ |
| 45 | (CH₂)₃ / 7-(4-ClC₆H₄CH₂O) | 4-(CH₂)₆OH |
| 46 | (CH₂)₃ / 7-(4-HOC₆H₄CH₂O) | 4-NHCHO |
| 47 | (CH₂)₃ / [7-(3,4,O CH₂O C₆H₃CH₂O)] | 4-NHCOCH(C₂H₅)CH₂CH₃ |
| 48 | (CH₂)₃ / 7-(3-CH₃C₆H₄CH₂O) | 3-CONHCH₂CH₂CH₂CH₃ |
| 49 | (CH₂)₃ / 7-(3-CH₃SO₂C₆H₄CH₂O) | 4-CONH₂ |

EXAMPLES 50–64

By following the manipulative procedure described above in Example 1, substituting for the 4,7-dichloroquinoline and the 3-[4-(N-methylcarbamyl)-1-piperidyl]-propylamine used therein molar equivalent amounts of an appropriate 2-halo-substituted-quinoline and an appropriate bis-[(substituted - 1 - piperidyl)-lower-alkyl]amine, there can be obtained the 2-{bis-[(substituted - 1 - piperidyl)-lower-alkyl]-amino}-substituted-quinolines of Formula Ib ($n$ is 2) listed below in Table 4:

TABLE 4

| Example | Y/R₁ | R₂/R₃ |
|---|---|---|
| 50 | (CH₂)₃ / 7-Cl | 4-CONHCH₃ |
| 51 | (CH₂)₃ / 7-Cl | 4-CONHC₂H₅ |
| 52 | (CH₂)₃ / 5-CH₃O | 4-CON(CH₃)₂ |
| 53 | (CH₂)₃ / 7-CH₃S | 4-CH₂OH |
| 54 | (CH₂)₃ / 7-CH₃SO | 4-CH₂CH₂CH₂OH |
| 55 | (CH₂)₂ / 7-CH₃SO₂ | 4-HO / 2,6-di-CH₃ |
| 56 | (CH₂)₅ / 7-C₆H₅CH₂CH₂O | 4-HO / 2,2,4,6,6-penta-CH₃ |
| 57 | (CH₂)₃ / 7-(4-ClC₆H₄CH₂CH₂O) | 4-HO / 2,2-di-CH₃-6-(CH₃)₂CHCH₂ |
| 58 | (CH₂)₃ / 7-(4-HOC₆H₄CH₂CH₂O) | 4-(CH₂)₆OH |
| 59 | (CH₂)₃ / [7-(3,4-OCH₂OC₆H₃CH₂CH₂O)] | 4-NHCHO |
| 60 | (CH₂)₃ / 7-(3-CH₃C₆H₄CH₂CH₂O) | 4-NHCOCH(C₂H₅)CH₂CH₃ |
| 61 | (CH₂)₃ / 7-(2-CH₃OC₆H₄CH₂CH₂O) | 3-CONHCH₂CH₂CH₂CH₃ |
| 62 | (CH₂)₃ | 4-CONH₂ |
| 63 | (CH₂)₃ | 4-CH₂C₆H₅ |
| 64 | (CH₂)₃ | 4-CH₂C₆H₁₁ |

EXAMPLE 65

4-[3-(4-cyclopentylmethyl - 1 - piperidyl) - 2 - methylpropyl] - 6 - trifluoromethylquinoline [Ia; R₁ is 6-CF₃, R₂ is 4-C₅H₉CH₂, R₃ is H, Y is CH₂CH(CH₃)CH₂, $n$ is 1].

Heating a mixture of 4-trifluoromethylaniline and ethyl formylacetate at a temperature around 100° C. and thermal cyclization of the resulting product by heating the latter in Dowtherm at a temperature around 250° C. affords 4-hydroxy-6-trifluoromethylquinoline.

The latter on reaction with phosphorus oxychloride affords 4-chloro-6-trifluoromethylquinoline.

Reaction of the latter with 3-(4-cyclopentylmethyl-1-piperidyl)-2-methylpropylamine in phenol at a temperature around 120° C. using the procedure described above in Example 1, affords 4-[3-(4-cyclopentylmethyl-1-piperidyl) - 2 - methylpropyl] - 6 - trifluoromethylquinoline. The 3-(4-cyclopentylmethyl - 1 - piperidyl) - 2 - methylpropylamine is in turn prepared by reaction of cyclopentylmethylmagnesium chloride with 4-piperidone, dehydration of the resulting carbinol with phosphorus oxychloride in pyridine, catalytic reduction of the resulting tetrahydropyridine derivative with hydrogen, reaction of the resulting piperidine with α-methylacrylonitrile, and catalytic reduction of the resulting nitrile with hydrogen over a rhodium-on-alumina catalyst.

EXAMPLE 66

4-[3-(4-cycloheptylmethyl - 1 - piperidyl) - 3 - methylpropylamino] - 5,7 - dibromoquinoline. [Ia; R₁ is 5,7-Br₂, R₂ is 4-C₇H₁₃CH₂, R₃ is H, Y is CH₂CH₂CH(CH₃), $n$ is 1].

Reaction of 3,5 - dibromoaniline with ethyl formylacetate at a temperature around 100° C., and thermal cyclization of the resulting anil by heating the latter in Dowtherm at a temperature around 250° C. affords 4-hydroxy-5,7-dibromoquinoline.

Reaction of the latter with phosphorus oxychloride affords 4-chloro-5,7-dibromoquinoline.

Reaction of the latter with 3-(4-cycloheptylmethyl-1-piperidyl) - 3 - methylpropylamine in phenol using the procedure described above in Example 1, affords 4-[3-(4-cycloheptylmethyl - 1 - piperidyl) - 3 - methylpropylamino] - 5,7 - dibromoquinoline. The 3-(4-cycloheptylmethyl - 1 - piperidyl) - 3 - methylpropylamine is in turn prepared by reaction of cycloheptylmethyl magnesium bromide with 4-piperidone, dehydration of the resulting carbinol with phosphorus oxychloride in pyridine, catalytic reduction of the resulting tetrahydropyridine derivative, reaction of the resulting piperidine with β-methylacrylonitrile, and catalytic reduction of the resulting nitrile over a rhodium-on-alumina catalyst.

EXAMPLE 67

4-[4-(4-cyclohexylmethyl - 1 - piperidyl) - 4 - methylbutylamino - 5, - diiodoquinoline. [Ia; R₁ is 5,7-I₂, R₂ is 4-C₆H₁₁CH₂, R₃ is H, Y is CH₂CH₂CH₂CH(CH₃), $n$ is 1].

Reaction of 3,5-diiodoaniline with ethylformylacetate at a temperature around 100° C., and thermal cyclization of the resulting anil by heating in Dowtherm at a temperature around 250° C. affords 4 - hydroxy - 5,7 - diiodoquinoline.

Reaction of the latter with phosphorus oxychloride affords 4-chloro-5,7-diiodoquinoline.

Reaction of the latter with 4-(4-cyclohexylmethyl-1-piperidyl) - 4 - methylbutylamine in phenol at a temperature around 120° C. according to the procedure described above in Example 1, affords 4-[4-(4-cyclohexylmethyl - 1 - piperidyl) - 4 - methylbutylamino] - 5,7 - diiodoquinoline. The 4-(4-cyclohexylmethyl - 1 - piperidyl)-4-methylbutylamine is in turn prepared by reaction of γ-chloro valeronitrile with 4-cyclohexylmethylpiperidine and catalytic reduction of the resulting nitrile over a rhodium-on-alumina catalyst.

EXAMPLE 68

4-{3-[4-(4 - methylmercaptobenzyl)-piperidyl]-3-methylpropylamino} - 5,7 - difluoroquinoline. [Ia; $R_1$ is 5,7-$F_2$, $R_2$ is 4-(4-$CH_3SC_6H_4CH_2$, $R_3$ is H, Y is

$n$ is 1].

Reaction of 3,5-difluoroaniline with ethyl formylacetate at a temperature around 100° C., and thermal cyclization of the resulting anil by heating in Dowtherm at a temperature around 250° C. affords 4 - hydroxy - 5,7 - difluoroquinoline.

Reaction of the latter with phosphorus oxychloride affords 4-chloro-5,7-difluoroquinoline.

Reaction of the latter in phenol at a temperature around 120° C. with 3-[4-(4-methylmercaptobenzyl)-1-piperidyl]-3-methylpropylamine according to the procedure described above in Example 1, affords 4-{3[-4-(4-methylmercaptobenzyl)-1-piperdyl]-1-methylpropylamino} - 5,7-difluoroquinoline. The 3-[4-(4-methylmercaptobenzyl)-1-piperidyl]-3-methylpropylamine is in turn prepared by reaction of 4-methylmercaptobenzyl magnesium chloride with 4-piperidone, dehydration of the resulting carbinol with phosphorus oxychloride in pyridine, catalytic reduction of the resulting tetrahydropyridine derivative, reaction of the resulting piperidine with β-methylacrylonitrile in the presence of a small amount of a strong base, and catalytic reduction of the resulting nitrile with hydrogen over a rhodium-on-alumina catalyst.

EXAMPLE 69

4-{3-[4-(4 - methylsulfinylbenzyl) - 1 - piperidyl]-3-methylpropylamino} - 5 - hydroxyquinoline. [Ia; $R_1$ is 5-hydroxy, $R_2$ is 4-$CH_3SOC_6H_5CH_2$, $R_3$ is H, Y is

$n$ is 1].

Reaction of a 3-hydroxyaniline with ethyl formylacetate at a temperature around 100° C., and thermal cyclization of the resulting anil by heating in Dowtherm at a temperature around 250° C. affords 4,5-dihydroxyquinoline.

The latter on reaction with phosphorus oxychloride affords 4-chloro-5-hydroxyquinoline.

Reaction of the latter in phenol at a temperature around 120° C. with 3-[4-(4-methylsulfinylbenzyl)-1-piperidyl]-3-methylpropylamine according to the procedure described above in Example 1, affords 4-{3-[4-(4-methylsulfinylbenzyl)-1-piperidyl[-3-methylpropylamino} - 5 - hydroxyquinoline. The 3-[4-(4-methylsulfinylbenzyl)-1-piperidyl]-3-methylpropylamine is in turn prepared by reaction of 4-methylsulfinylbenzyl magnesium chloride with 4-piperidone, dehydration of the resulting carbinol with phosphorus oxychloride in pyridine, catalytic reduction of the resulting tetrahydropyridine reaction of the resulting piperidine derivative with β-methylacrylonitrile, and catalytic reduction of the resulting nitrile with hydrogen over a rhodium-on-alumina catalyst.

EXAMPLE 70

4 - {3 - [4-(2,6-dibromobenzyl)-1-piperidyl]-3-methylpropylamino}-5-methyl-7-chloroquinoline. [Ia, $R_1$ is 5-$CH_3$-7-Cl, $R_2$ is 2,6-$Br_2C_6H_3CH_2$, $R_3$ is H, Y is

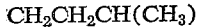

$n$ is 1].

Reaction of 3-methyl-5-chloroaniline with ethyl formylacetate at a temperature around 100° C., and thermal cyclization of the resulting anil in Dowtherm at a temperature around 250° C. affords 4-hydroxy-5-methyl-7-chloroquinoline.

Reaction of the latter with phosphorous oxychloride affords 4,7-dichloro-5-methylquinoline.

Reaction of the latter in phenol at about 120° C. with 3-[4-(2,6-dibromobenzyl) - 1 - piperidyl] - 3 - methylpropylamine according to the procedure described above in Example 1 affords 4-{3-[4 - (2,6 - dibromobenzyl) -1-piperidyl[-3-methylpropylamino} - 5 - methyl-7-chloroquinoline. The 3-[4-(2,6-dibromobenzyl) - 1 - piperidyl]-3-methylpropylamine is in turn prepared by reaction of 2,6-dibromobenzyl magnesium bromide with 4-piperidone, dehydration of the resulting carbinol with phosphorous oxychloride in pyridine, catalytic reduction of the resulting tetrahydropyridine, reaction of the resulting piperidine derivative with β-methylacrylonitrile, and catalytic reduction of the resulting nitrile over rhodium-on-alumina.

EXAMPLE 71

4-{3-[4-(4-iodobenzyl) - 1 - piperidyl]propylamino}-5-methoxy - 7 - bromoquinoline. [Ia; $R_1$ is 5-$CH_3O$-7-Br, $R_2$ is 4-$IC_6H_4CH_2$, $R_3$ is H, Y is $(CH_2)_3$, $n$ is 1].

Reaction of 3-methoxy-5-bromoaniline with ethyl formylacetate at a temperature around 100° C., and thermal cyclization of the resulting anil in Dowtherm at a temperature around 250° C. affords 4-hydroxy-5-methoxy-7-bromoquinoline.

Reaction of the latter with phosphorus oxychloride affords 4-chloro-5-methoxy-7-bromoquinoline.

Reaction of the latter in phenol at a temperature of around 120° C. with 3-[4-(4-iodobenzyl) - 1 - piperidyl] propylamine according to the procedure described above in Example 1, affords 4-{3-[4-(4-iodobenzyl)-1-piperidyl]propylamino}-5- methoxy - 7 - bromoquinoline. The 3-[4-iodobenzyl) - 1 - piperidyl]propylamine is in turn prepared by reaction of 4-iodobenzyl magnesium bromide with 4-piperidone, dehydration of the resulting carbinol with phosphorus oxychloride in pyridine, catalytic reduction of the resulting tetrahydropyridine, reaction of the resulting piperidine derivative with acrylonitrile, and catalytic reduction of the resulting nitrile.

The compounds of Formulas Ia and Ib have been shown in standard and recognized pharmacological tests to possess hypotensive activity.

Thus using the photoelectric tensometer foot test described by Kersten et al., J. Lab. Clin. Med. 32, 1090 (1947), the Average Effective Dose$_{50}$ (AED$_{50}$) of 4-<N,N-bis-{3-[4-(N-methylcarbamyl) - 1 - piperdyl]propyl}amino>-7-chloroquinoline, prepared above in Example 6, administered subcutaneously in the unanesthetized renal hypertensive rat, was found to be about 10 mg./kg.; and the AED$_{50}$ of 4-{3-[4-(N,N-dimethylcarbamyl) - 1 - piperidyl]propylamino} - 7 - chloroquinoline, prepared above in Example 4, administered subcutaneously in the unanesthetized renal hypertensive rat, was found to be 17.5 mg./kg.

The compounds of the invention can be prepared for use by dissolving under sterile conditions a salt form of the compounds in water (or an equivalent amount of a non-toxic acid if the free base is used), or in a physiologically compatible aqueous medium such as saline, and stored in ampoules for intramuscular injection. Alternatively, they can be incorporated in unit dosage form as tablets or capsules for oral administration either alone or in combination with suitable adjuvants such as calcium carbonate, starch, lactose, talc, magnesium stearate, gum acacia, and the like. Still further, the compounds can be formulated for oral administration in aqueous alcohol, glycol or oil solutions or oil-water emulsions in the same manner as conventional medicinal substances are prepared. When used as hypotensive agents, they are formulated and used in the same manner as conventional hypotensive agents, such as reserpine preparations, and indeed can be used advantageously in combination with such hypotensive agents.

We claim:
1. A compound having the formula:

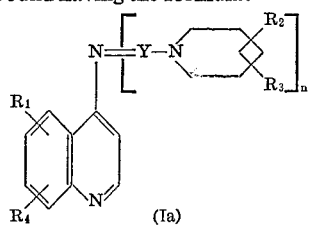

(Ia)

or the formula:

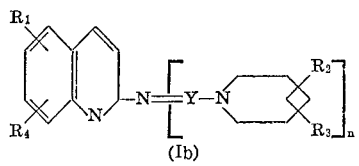

(Ib)

where $n$ is one of the integers 1 and 2, and when $n$ is 1, the third valence of the amino nitrogen atom of the (1-piperidyl)-lower-alkylamino group is taken up by an atom of hydrogen; $R_1$ and $R_4$ are hydrogen or together a methylenedioxy attached to adjacent carbon atoms or $R_1$ is a sterically accommodatable member of the group consisting of lower-alkyl, hydroxy-lower-alkyl, chlorine, lower-alkoxy, hydroxy except 8-hydroxy, phenyl-lower-alkoxy, trifluoromethyl, lower-alkylmercapto, lower-alkylsulfinyl, and lower-alkylsulfonyl, and $R_4$ is a sterically accommodatable member of the group consisting of lower-alkyl, hydroxy-lower-alkyl, chlorine, lower-alkoxy, hydroxy except 8-hydroxy, phenyl-lower-alkoxy, or trifluoromethyl; $R_2$ is carbamyl, N-lower-alkylcarbamyl, N,N-di-lower-alkylcarbamyl, hydroxy-lower-alkyl, lower-alkanoylamino, phenyl-lower-alkyl, or cycloalkyl-lower-alkyl having from five to seven ring carbon atoms, and wherein the phenyl nucleus of the $R_1$ group as phenyl-lower-alkoxy and the $R_2$ group as phenyl-lower-alkyl is unsubstituted or is substituted by methylenedioxy attached to adjacent carbon atoms or by one or two of the same or different sterically accommodatable members of the group consisting of chloro, lower alkyl, or lower-alkoxy, or identical lower-alkylmercapto, lower-alkylsulfinyl, or lower-alkylsulfonyl; $R_3$ is hydrogen of from one to four stearically accommodatable lower-alkyl groups of two or more carbon atoms or from one to five methyl groups; and Y is lower-alkylene of from two to five carbon atoms and interposing at least two carbon atoms between the amino nitrogen atom of the (1-piperidyl)-lower-alkylamino group and the ring nitrogen atom of the piperidine nucleus.

2. A compound of Formula Ia according to claim 1 where $n$ is 1, $R_1$ is chloro, $R_4$ is halogen, $R_2$ is carbamyl, and $R_3$ is hydrogen.

3. A compound of Formula Ia according to claim 1 where $n$ is 1, $R_1$ is chloro, $R_4$ is halogen, $R_2$ is N-lower-alkylcarbamyl, and $R_3$ is hydrogen.

4. A compound of Formula Ia according to claim 1 where $n$ is 1, $R_1$ is chloro, $R_4$ is halogen, $R_2$ is N,N-di-lower-alkylcarbamyl, and $R_3$ is hydrogen.

5. A compound of Formula Ia according to claim 1 where $n$ is 2, $R_1$ is chloro, $R_4$ is halogen, $R_2$ is N-lower-alkylcarbamyl, and $R_3$ is hydrogen.

6. 4 - [3 - (4-carbamyl-1-piperidyl)propylamino]-7-chloroquinoline according to claim 2 where $R_1$ is 7-chloro, and Y is 1,3-propylene.

7. 4 - {3-[4-(N-methylcarbamyl)-1-piperidyl]propylamino}-7-chloroquinoline according to claim 3 where $R_1$ is 7-chloro, $R_2$ is 4-CONHCH$_3$, and Y is 1,3-propylene.

8. 4 - {3 - [4-(N-ethylcarbamyl)-1-piperidyl]propylamino}-7-chloroquinoline according to claim 3 where $R_1$ is 7-chloro, $R_2$ is 4-CONHC$_2$H$_5$, and Y is 1,3-propylene.

9. 4 - {3 - [4 - (N,N-dimethylcarbamyl)-1-piperidyl]propylamino}-7-chloroquinoline according to claim 4 where $R_1$ is 7-chloro, $R_2$ is 4-CON(CH$_3$)$_2$, and Y is 1,3-propylene.

10. 4 - {3 - [4 - (N,N-diethylcarbamyl)-1-piperidyl]propylamino}-7-chloroquinoline according to claim 4, where $R_1$ is 7-chloro, $R_2$ is 4-CON(C$_2$H$_5$)$_2$, and Y is 1,3-propylene.

11. 4 - <N,N-bis-{3-[4-(N-methylcarbamyl)-1-piperidyl - propyl} - amino> - 7-chloroquinoline according to claim 5 where $R_1$ is 7-choro, $R_2$ is 4-CONHCH$_3$, and Y is 1,3-propylene.

12. 4 - <N,N - bis-{3-[4-(N-ethylcarbamyl)-1-piperidyl]-propyl}-amino>-7-chloroquinoline according to claim 5 where $R_1$ is 7-chloro, $R_2$ is 4-CONHC$_2$H$_5$, and Y is 1,3-propylene.

References Cited
UNITED STATES PATENTS 3,262,936   7/1966   Zewitz et al. _____ 260—288X

OTHER REFERENCES

Burger: "Medicinal Chemistry," 2d. ed. Interscience, 1960, pp. 42–3.

DONALD G. DAUS, Primary Examiner

U.S. Cl. X.R.

260—270, 271, 283, 286, 287, 289, 293, 294, 471, 999

PO-1050
(5/69)

UNITED STATES PATENT OFFICE

CERTIFICATE OF CORRECTION

Patent No. 3,573,313  Dated  March 30, 1971

Inventor(s) B.L. Zenitz and A.R. Surrey

It is certified that error appears in the above-identified patent and that said Letters Patent are hereby corrected as shown below:

Column 2, line 67, "substituents" should read --substituent--.

Column 6, line 73, "bis-[1-piperidyl)" should read --bis-[(1-piperidyl)--; line 74, "mono-[1-..." should read --mono-[(1-...--.

Column 8, line 4, "Formulas Ia and Id" should read --Formulas Ia and Ib--.

Column 9, line 6, "esnse" should read --sense--; line 27, "cyclohexanearboxylic" should read --cyclohexanecarboxyl--; line 33, "benzenesulfonic" should read --benzenesulfinic--; line 38, "nitric aid" should read --nitric acid--; lines 41 and 42 "barbituri" should read --barbituric--.

Column 10, line 17, "chloic" should read --cholic--;

Column 11, line 10, "Formula Ia listed" should read --Formula Ia (n is 1) listed--; Example 14, "7-4-$HOC_6H_4CH_2O$)" should read --7-(4-$HOC_6H_4CH_2O$)--; Example 24, "7-4($ClC_6H_4CH_2$(" should read --7(4-$ClC_6H_4CH_2CH_2O$)--; Example 30, "$(CH_3)_2$" should read --$(CH_2)_3$--; Example 32, insert the number --2-- in the column headed "n".

Column 14, lines 60-61, "methylbutylamino-5,-diiodoquinoline" should read --methylbutylamino]-5,7-diiodoquinoli--

Column 15, line 9, "4-(4-$CH_3SC_6H_4CH_2$," should read --(4-$CH_3SC_6H_4CH_2$),--.

Column 16, line 34, "[4-iodobenzyl)" should read --[4-(4-iodobenzyl)--.

FO-1050
(5/69)

UNITED STATES PATENT OFFICE
CERTIFICATE OF CORRECTION

Patent No. 3,573,313  Dated March 30, 1971

PAGE -2

Inventor(s) B.L. Zenitz and A.R. Surrey

It is certified that error appears in the above-identified patent and that said Letters Patent are hereby corrected as shown below:

Column 17, line 44, "hydrogen of from" should read --hydrogen or from--; line 44, "stearically" should read --sterically--.

Column 18, lines 2, 5, 8, and 11, in each instance, "R is halogen" should read --$R_4$ is hydrogen--; lines 30 and 31, "piperidyl-propyl}" should read --piperidyl]propyl}--.

Signed and sealed this 9th day of November 1971.

(SEAL)
Attest:

EDWARD M. FLETCHER, JR.
Attesting Officer

ROBERT GOTTSCHALK
Acting Commissioner of P